P. M. RAINEY.
FLUCTUATION DAMPING MEANS FOR ROTATABLE MEMBERS.
APPLICATION FILED DEC. 26, 1914.
1,271,362.
Patented July 2, 1918.
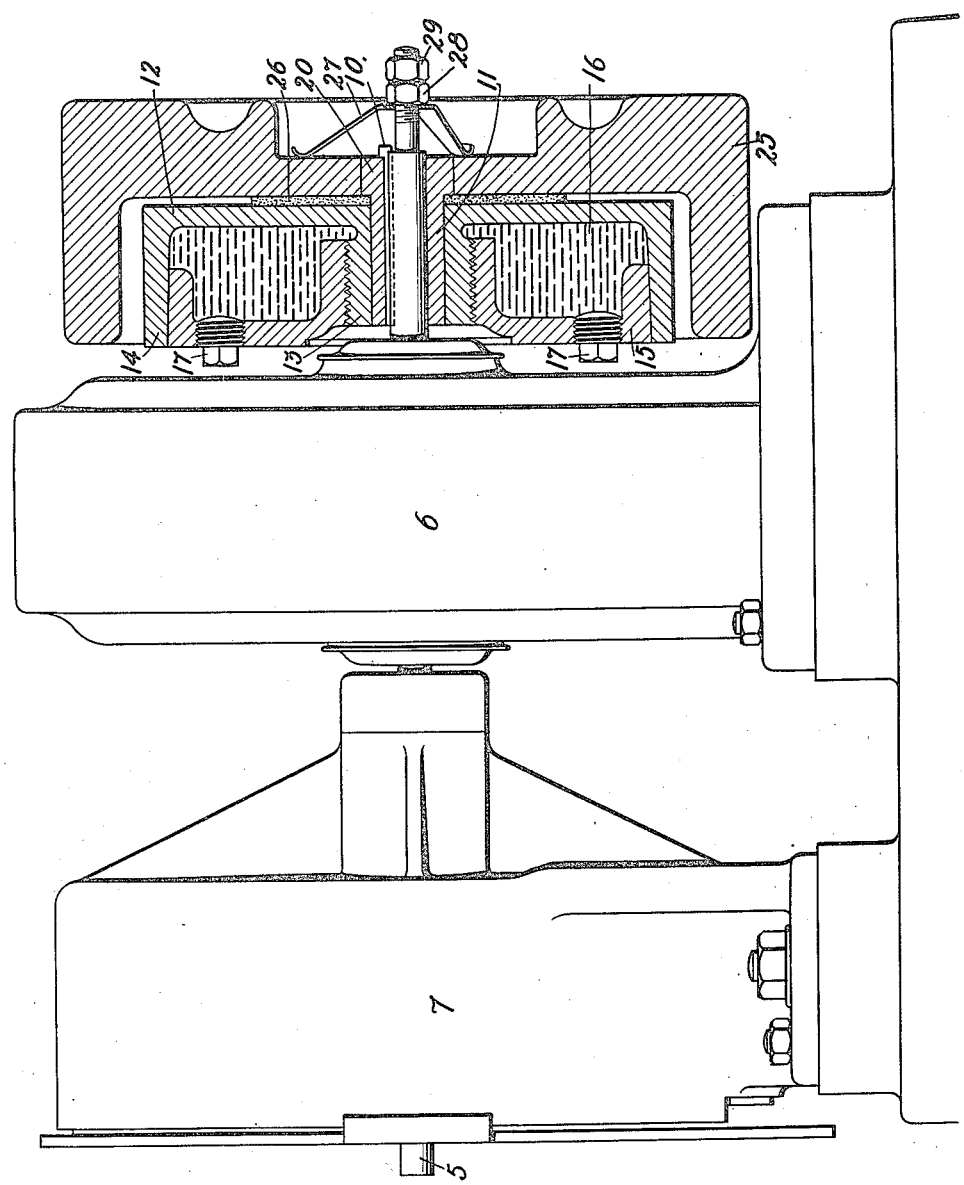
Witnesses:
Inventor:
Paul M. Rainey
by
Att'y

UNITED STATES PATENT OFFICE.

PAUL M. RAINEY, OF GLEN RIDGE, NEW JERSEY, ASSIGNOR, BY MESNE ASSIGNMENTS, TO WESTERN ELECTRIC COMPANY, INCORPORATED, A CORPORATION OF NEW YORK.

FLUCTUATION-DAMPING MEANS FOR ROTATABLE MEMBERS.

1,271,362.     Specification of Letters Patent.     Patented July 2, 1918.

Application filed December 26, 1914. Serial No. 879,040.

*To all whom it may concern:*

Be it known that I, PAUL M. RAINEY, a citizen of the United States, residing at Glen Ridge, in the county of Essex and State of New Jersey, have invented certain new and useful Improvements in Fluctuation-Damping Means for Rotatable Members, of which the following is a full, clear, concise, and exact description.

This invention relates to means for damping out the speed fluctuations of a rotating system, and has for its object the production of damping forces acting upon rotating members to minimize or prevent excessive speed fluctuations therein due to disturbing influences whereby any increase or decrease in speed of the rotating system will be a gradual one. The disturbing influences tending to cause the rotating members to fluctuate may vary in range and may be due to inherent characteristics of the driving means, such as the tendency of a synchronous motor to hunt or they may be caused by extraneous forces.

In accordance with the general characteristics of this invention, what in the system may be considered the main rotating member is supplied with a damping device, comprising two fly-wheels having different characteristics, operating to dampen out or prevent undue fluctuations by the production of frictional effects which may be called damping friction. One of the fly-wheels is so constructed and associated with the member that the damping friction produced by it is at a minimum when there is no relative movement between them, but increases with any change, however slight, in the relative movement of the two. This damping friction, starting at a minimum, increases as the relative movement between this fly wheel and the member increases. The relative movement depends upon the rate or acceleration at which the fluctuation of the member takes place and the friction between the member and the fly wheel, and since this fly wheel is to be efficacious for small speed variations, the initial or static friction should be relatively small. Since it has been found by experiment that it is objectionable to construct a fly wheel possessing the above characteristics which will effectively dampen the greater fluctuations, a second fly wheel is provided. With this second fly wheel, on the other hand, the damping friction produced should be relatively high at the instant the relative movement between it and the member begins. Since the second fly wheel is for the purpose of damping out the greater fluctuations, it should be so constructed and associated with the member that the static friction between them is only overcome with resulting relative movement, and consequently damping friction by such fluctuations. When the relative movement has once begun, the friction between the member and this fly wheel, and consequently the damping friction, may increase or decrease. With this construction and coöperation of parts, the first fly wheel tends to dampen out even the most minute fluctuations, being assisted by the second fly wheel only when the fluctuations are sufficient to overcome the static friction between the second fly wheel and the member, such fluctuations being too great to be effectively damped out by the action of the first fly wheel alone.

The first fly wheel is preferably an annular body of liquid, the container of which is secured firmly to and preferably forms a part of the rotating member. It is a well-known physical fact that the friction between a liquid and a solid, with which it is in contact, is zero when there is no relative movement between them, and that the friction increases as the relative movement increases. An annular body of liquid, therefore, most admirably meets the conditions required of the first fly wheel. The other may be an ordinary solid fly wheel frictionally connected with the rotating member in such a manner that it may be moved independently thereof. With this arrangement the damping friction is greatest at the instant relative movement begins, and decreases as the relative movement increases. Means may be provided for varying the frictional engagement of the solid fly wheel and the rotating member to any desired amount.

For convenience of illustration, the invention is shown as applied to the shaft 5 of a synchronous motor 6 which may be of the phonic or Le Cour type, and which is connected to drive a brush distributer 7, such as are familiar in the printing telegraph art. It is obvious, however, that the invention is not limited in its application to the illustrated devices.

As will be noted, the shaft 5 of the motor 6 is extended a distance beyond the end of the frame and has secured thereto by means of a key 10 a sleeve 11. Secured firmly to this sleeve 11 is a cylindrical containing member 12 having a screw-threaded hub 13 and a flange 14. The inner surface of the flange 14 is slightly tapered to receive a tapered closing member 15 which is threaded upon the hub 13 to form with the interior of said casing member 12 an annular chamber 16 into which mercury or other suitable liquid may be inserted through openings normally closed by plugs 17, 17.

Rotatably mounted upon an extension 20 of the sleeve 11 is a solid metal fly wheel 25 of considerable inertia. Interposed between the adjacent faces of the two fly wheels is a washer 26 of felt or any other suitable material for creating friction between said fly wheels. The pressure between this washer 26 and the two fly wheels may be regulated by means of a tensioning spring 27 and adjusting nuts 28 and 29 therefor.

While the fly wheel 25 is shown as embracing the container of the liquid fly wheel and frictionally connected with the shaft 5 through one face thereof, this is merely for the purpose of economy in space, as it is obvious that the same results would be obtained if the fly wheel 25 was mounted a distance away from the liquid fly wheel on the shaft and other forms of frictional connecting means between the fly wheel 25 and the shaft 5 were provided.

The damping friction between the liquid and the shaft 5 through the walls of the container is at a minimum when there is no relative movement between the liquid and the container but increases as the relative movement between the two increases. The damping friction between the fly wheel 25 and the shaft 5 is at a maximum at the moment relative movement between the shaft and the fly wheel begins, and decreases as the relative movement between the two increases. With this particular combination of fly wheels it has been found possible to dampen out all fluctuations or vibrations of a rotating shaft so that any increase or decrease in speed will be at a uniform rate.

What is claimed is:

1. The combination of a rotatable member subject to speed fluctuations, with means for producing damping friction to dampen out said fluctuations, comprising two fly wheels of different characteristics and capable of relative movement with respect to said member, the relative movement being caused by speed fluctuations, the damping friction produced by one of said wheels being relatively small when such movement begins and the damping friction produced by the other of said fly wheels being relatively large when such movement begins.

2. The combination with a rotating member subject to speed fluctuations, of means for damping the fluctuations of said rotating member comprising a pair of independently operable fly wheels, the damping friction between one of said fly wheels and said member increasing, and the damping friction before the other of said fly wheels and said member decreasing as the relative movement between the respective fly wheels and said member increases.

3. The combination with a rotating member subject to speed fluctuation, of means for damping out said fluctuations, said damping means comprising a liquid fly wheel the container for which is secured rigidly to said member and a solid fly wheel frictionally secured to said member whereby it may rotate independently thereof.

4. The combination with a rotating member subject to speed fluctuation, of means for damping out said fluctuations comprising a liquid fly wheel the container for which is fixed to said member, a solid fly wheel mounted upon said member, frictional connecting means interposed between said solid fly wheel and said member, and means for varying the pressure upon said frictional connection.

5. The combination with a rotating member subject to speed fluctuations, of means for applying said rotating member in accordance with the fluctuations thereof, damping effects presenting different characteristics for damping out said fluctuations.

6. The combination with a rotating member subject to speed fluctuations, of means for damping out said fluctuations comprising two independently operable fly wheels of different characteristics, each fly wheel producing its maximum damping effect when the damping effect of the other fly wheel is at a minimum.

In witness whereof, I hereunto subscribe my name this 24th day of December, A. D., 1914.

PAUL M. RAINEY.

Witnesses:
E. EDLER,
K. L. STAHL.